Figure 1:
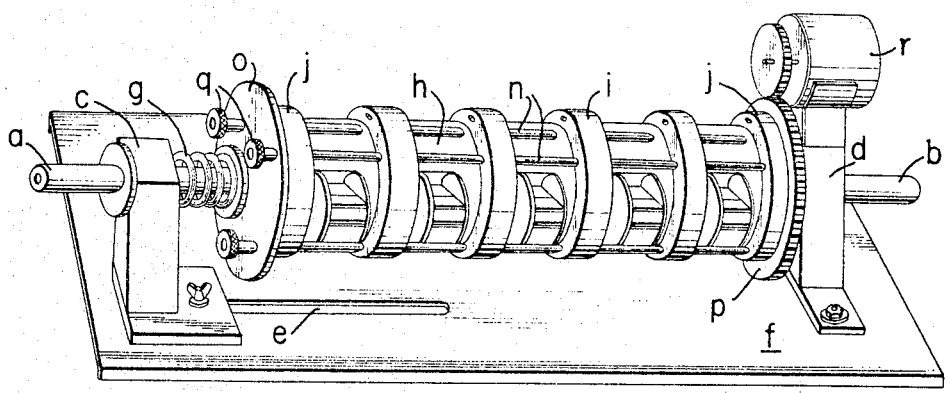

Oct. 4, 1966    S. H. SVENSSON ETAL    3,276,751
MIXING DEVICE FOR PRODUCING A FLOW OF LIQUID OF CONTINUOUSLY
VARIABLE COMPOSITION
Filed July 1, 1963    2 Sheets-Sheet 1

INVENTORS
SVANTE HARRY SVENSSON,
ALFRED FORCHHEIMER

INVENTORS
SVANTE HARRY SVENSSON
ALFRED FORCHHEIMER

United States Patent Office 3,276,751
Patented Oct. 4, 1966

3,276,751
MIXING DEVICE FOR PRODUCING A FLOW OF LIQUID OF CONTINUOUSLY VARIABLE COMPOSITION
Svante Harry Svensson, Spanga, and Alfred Forchheimer, Farsta, Sweden, assignors to Ingenjörsfirman Consulta, a company of Sweden
Filed July 1, 1963, Ser. No. 292,056
Claims priority, application Sweden, July 5, 1962, 7,525/62
11 Claims. (Cl. 259—3)

This invention relates to an improvement in a so-called gradient mixer, that is, a device for producing a flow of liquid of continuously varying composition. Such arrangements have a wide application in modern chemical research, above all in chromatographic work when it is desired, during an elution process, continuously to increase the eluting power of the flowing liquid in order to set free even strongly sorbed substances by reasonable volumes of liquid. In electrophoretic work and in preparative centrifugation, density gradients have begun to be used as stabilizers against convection, which improves the safety in boundary separations and, moreover, makes zonal separations possible. In most of these applications of liquid gradients, it is of considerable importance to be able to prepare them reproducibly from time to time. From a gradient mixer it is further required that it should be adaptable to various courses of the composition of the liquid (linear, concave, and convex courses) and to different total volumes within which variation occurs. Finally, it ought to be simple and convenient to handle.

Most gradient mixers described in the current literature work with open mixing chambers, arranged mutually parallel or in series, and equipped with devices for homogenization. No such arrangements can satisfy higher demands on accuracy and reproducibility. The resulting gradient must depend on differences in viscosity except at a vanishingly low rate of flow; consequently, in practical applications one has to cope with a dependence on the rate of flow. Further the equilibrium levels in open, communicating vessels depend on the densities of the liquids which are to be mixed, while hitherto published theories for gradient mixers postulate equal levels and thus equal densities. This circumstance is irritating above all when the problem is to prepare density gradients, but even when other gradients are to be made by the use of liquids of different density.

A number of other gradient mixers that have been described work with closed mixing chambers and consequently give sufficiently reproducible gradients. They have, however, an insufficient adaptability to various demands concerning the shape of the gradient and the total volume.

Every gradient mixer must have arrangements for steady homogenization of the contents of the mixing chambers. In hitherto known devices, this is accomplished by mechanical or magnetical drive of stirring bodies enclosed in stationary mixing chambers. If, instead, a relative motion between stirring bodies and chambers is accomplished by a driving arrangement acting on the chambers, several important advantages are gained. First, the stirring bodies can be made very simple and can, moreover, be loosely included or pivoted within the chambers, whereby complicated mechanical constructions for driving of several stirring bodies, separated in space, can be omitted. The essential requirement to be put on the stirring bodies is only the one that they have to be heavier or lighter than the liquids to be mixed, so that they do not follow the movements induced in the liquids by the motion of the chambers. A third alternative is represented by stirring bodies with one heavy and one light end; such bodies always tend to assume a vertical orientation.

Second, the volume of the stirring bodies can easily be varied as a means for varying the free total volume of the system of chambers, since the stirring bodies need not fit to any mechanical driving arrangement. A sufficiently effective stirring body need not be larger than a few percent of the chamber volume. On the other hand, the stirring body can be chosen so big that only a small portion of the chamber volume remains for the liquids to be mixed.

Third, with such an arrangement an increased convenience is gained in disassembling for cleaning and in remounting.

The present invention, which is distinguished by a very high accuracy and reproducibility in liquid gradients produced with its aid and by a good adaptability to various demands, is thus characterized by at least two series-coupled mixing chambers, closed but for relatively to the chamber dimensions narrow ducts between the chambers, by means for introduction of liquid to one end and for removal of liquid from the other end of the chamber system, by stirring bodies included in the chambers, these bodies containing at leats one material with a density outside the density range of the liquids to be mixed, and by means for impelling a motion to the system of chambers in order to realize a relative motion between the chambers and the stirring bodies.

Among the types of motion which can be considered for the system of chambers according to the invention, a turning motion stands in contrast to a shuttling motion. In the former case the gravitational force will induce the stirring bodies to move relatively to the surrounding liquid, thereby effecting homogenization. In the latter case, the inertia of the stirring bodies will induce a motion relatively to the surrounding liquid, with the same effect.

A turning motion is simpler to perform and can in the general case be regarded as more favorable with reference to stirring effect, freedom from noise and vibration, etc. The simplest turning motion is in principle a rotation of the chambers, which in a special case according to the invention is so arranged that the whole system of chambers rotates round a common axis. One important variety of the invention is characterized by a rocking motion of the chamber system, in a special case round a common axis.

As a matter of principle, the chambers can have any form, but with reference to constructive view-points and to the desirability of achieving good stirring effect and at the same time adaptability to different volumes, essentially cylindrical chambers are preferred. If such chambers are thus chosen, there is really all reason to have parallel cylinder axes, and the construction becomes especially simple if all cylindrical chambers have a common axis which also serves as axis of rotation. Other varieties are, however, possible and may have certain advantages. Thus an arrangement with cylindrical chambers with mutually parallel axes, but with an axis of rotation making an angle with these axes, possesses certain advantages if combined with a certain type of stirring body. This will be considered below in conjunction with a discussion of the performance of the stirring bodies.

An important constructive advantage of cylindrical mixing chambers lies in the possibility of mounting them together from disc- and tube-shaped elements. In the case that the chambers are arranged on a common axis, every disc element except the two end discs can, moreover, form a common wall between two neighboring chambers.

If the average density, defined as the ratio between the total mass and the total volume, of a stirring body is either larger than the density of the heaviest liquid in the system, or smaller than the density of the lightest liquid in the system, this stirring body will always stick to the bottom or float at the ceiling of the mixing chamber. When the latter is put into motion, therefore, a relative motion between stirring body and surrounding liquid will be generated. Such a property of a stirring body is, however, only a sufficient, but not a necessary condition. The stirring body can also have an arbitrary average density if it is composed of at least two materials, one specifically heavier than the heaviest liquid in the system, the other specifically lighter than the lightest liquid in the system. If these two materials are so distributed within the volume of the stirring body that the latter assumes a definite orientation in a vertical plane when it is submerged in a liquid with a density not very different from the average density of the stirring body, then the latter will tend to maintain this orientation even when the chamber, and therewith the liquid, is put into motion. By this means, the stirring body will remain essentially stationary, gliding with a light pressure against the bottom or the ceiling of the chamber, or freely floating in the surrounding liquid, whereby a stirring and homogenizing effect results.

The stirring bodies which have to be used in the present invention can be movably attached to the internal walls of the chambers, but according to a preferential performance they are loosely included in the chambers. In the latter case, the possible stirring bodies can be subdivided into three catergories, viz. bodies which have at least a solid shell, liquid bodies, and gaseous bodies. In all three cases it is of course demanded that the stirring bodies have to be essentially insoluble in and chemically resistant to the liquids to be mixed.

Stirring bodies in the form of included bubbles of air or other gases are consequently entirely feasible if only care is taken to secure a low solubility in the liquids to be mixed and to make sure that the liquids, but not the gas, can pass through the ducts between chambers. Gaseous stirring bodies have the advantage of not causing any extra cost, at least in the case of air, and of allowing a very convenient and, in addition, a continuous variation within wide limits of the liquid volume within the chambers. A serious draw-back is, however, the high compressibility, which endangers the reproducibility of the arrangement by possible changes in the liquid volumes in the chambers due to changes in pressure and temperature. The low density has also the consequence that even a very low solubility in the liquids to be mixed may change the gas volume considerably. It is thus absolutely necessary to saturate the liquids with the gas in question before the gradient mixer is started. Gaseous stirring bodies, consequently, cannot be expected to give the best possible results.

Liquid stirring bodies have the same advantages as gaseous ones as concerns low price and flexibility in volume. Further, they have the advantage of being practically incompressible. The sole difficulty with liquid stirring bodies thus lies in the demand that the ducts between chambers must be permeable to the liquids to be mixed but impermeable to the stirring liquid. Possible ways to accomplish this will be described in another connection. One can also consider having the ducts located in such a way, and choosing such a speed of motion for the chambers, that the stirring liquid remains practically immovable at a safe distance from the openings of the ducts in the chambers. Non-polar liquids (carbon tetrachloride, paraffin oil, to mention a couple of examples of heavy and light stirring liquid) can be used for mixing water solutions. On the other hand, water can be applied as a stirring liquid for mixing of oils.

The preferential performance of a stirring body for use in the present invention is, however, the one that can be described as having at least a solid shell of a material which is essentially resistant against the liquids to be mixed. Among these types of stirring bodies, rollable bodies attract a considerable interest, especially since a preferential embodiment of a mixing chamber is cylindrical in shape.

Certain types of rolling bodies have just one point of contact with a supporting plane and can roll round more than one axis. Spherical, rotation-ellipsoidal, and egg-shaped bodies belong to this group, and they may be solid throughout, in which case they generally roll on the bottom of the chambers, or hollow, in which case they may roll against their ceilings. These types of rolling bodies are preferred when the rotation and cylinder axes of the chambers make an angle with each other. They will then carry out rolling movements both tangentially and axially within the cylinders, whereby a maximum of homogenizing effect is achieved. Ball-shaped rolling bodies are, however, preferably useful also in other connections.

If a rolling body is not ball-shaped, it has at least two points of contact with a supporting plane. It can be rolled round a non-arbitrary axis, which, however, can change relatively to the body while it is rolling, and which has to be defined in the following way. A roll-axis of a rolling body in a certain position on a plane support means the straight line connecting the two centres of curvature for the two farthest points of contact with the supporting plane in those planes which are perpendicular to the supporting plane and parallel with the direction of the rolling.

Figure 7:
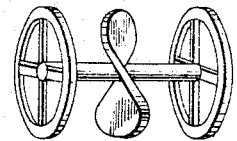
Figure 8:
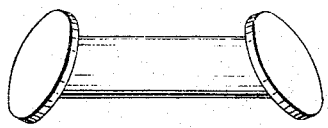
Figure 9:
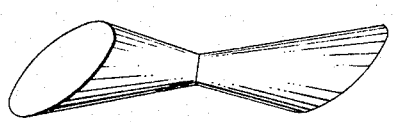

Consider for example a rolling body of the type shown in FIG. 7. This rolling body has only two points of contact with a plane support, one in each wheel. Through these contact points, planes are drawable which are parallel with the direction of rolling and perpendicular to the supporting plane. In this case, these planes coincide with the planes of the wheels. The centers of curvature with respect to the contact points in these planes lie in the centers of the wheels if these are circular. However, if a wheel were elliptical, the center of curvature with respect to the contact point would be close to the supporting plane when the wheel stood on its long axis, whereas it would be far from said plane when the wheel rested on its short axis. The center of curvature thus moves up and down for every non-circular wheel. The roll axis is a straight line connecting the two centers of curvature in the two wheels. Consequently, the roll axis will also move up and down if both wheels are identical ellipses with mutually parallel long axes; the roll axis then changes position, *but not axial direction*. If two elliptical wheels have mutually perpendicual long axes, one center of curvature moves up while the other moves down; the roll axis then changes its direction in space while the body is rolling.

One preferential performance of such a rolling body is characterized by a roll axis which does not change its axial direction in space while the body is rolling. The roll-axis will then generate some kind of cylindrical surface during the rolling. One example of such a rolling body is a cylinder with an ellipsoidal cross-section, in a special case an ordinary circular cylinder.

Rolling bodies which are essentially axial-symmetric with reference to an axis parallel with the roll-axis give rise to a turbulence with essentially radial and tangential speed components when they roll within a cylindrical chamber. It is however desirable that the turbulence also includes a powerful axial component. A rolling body of the kind under discussion should consequently be constructed with surfaces of considerable added dimensions being non-perpendicular to the roll-axis. However, it should be noticed that rotation surfaces with reference to a roll axis fixed relatively to the rolling body do not cause any axial velocity component in the surrounding liquid. Examples of effective rolling bodies of the kind just discussed are obliquely cut cylinders, obliquely cut double-cones, and rolling bodies made essentially as screws with deep threads and high pitch.

A rolling body with a fixed direction for the roll-axis can also be constructed as two mutually connected wheels which are skewly oriented toward the direction of the roll-axis and which need not, and should not, be circular. In order to make the direction of the roll-axis constant during rolling, these wheels have to be made and oriented so as to cause their projections on a plane perpendicular to the direction of the desired roll-axis to be superposed closed curves; in a special case, circles. If the skewly oriented wheels are made as discs, that is non-spoked, they will give rise to a considerable axial stirring effect in a cylindrical chamber. They will also give strong radial and tangential speed components in the surrounding liquid, and these can be enlarged still more by a suitable performance of the item connecting the two wheels. In addition, the latter can be equipped with propeller, whereby the axial speed component of the turbulence is still more improved.

A rolling body can also be so constructed that its roll-axis, as it has been defined, changes its direction in space during the rolling. It will then generate some kind of cone in space, and the rolling body itself will get simultaneously a rolling and a rocking motion. The latter component of the motion will then contribute to give the liquid an axially directed velocity component.

Loosely included stirring bodies need not necessarily be rollable. They can also be constructed for gliding along the bottom or ceiling of the chambers during their motion. It is also possible that rollable bodies, under certain conditions, glide instead of roll within a moving chamber. Stirring bodies specially designed for gliding can under certain conditions have a very good homogenizing effect. This is especially the case when the rotation axis makes an angle with the cylinder axes of the chambers, when the gliding motion is axial, and when the gliding body occupies the greater part of the chamber volume. The axial component of the turbulence can then be made especially great, which is not so easy to achieve with rolling bodies.

Loosely included stirring bodies can finally be given such a form in relation to the internal walls of the chambers that they can neither roll, nor glide during the motion of the chambers, but only overturn. Such overturning bodies are at times stationary with respect to the chambers, but overturn on another side in the moment where the centre of gravity comes outside the supporting area, thereby inducing a powerful turbulence in the surrounding liquid.

Rolling, gliding, and overturning bodies are not sharply distinguished from each other; one and the same stirring body can under different circumstances (construction and type of motion of the chambers) function in one way or the other.

Instead of loosely included stirring bodies, one can also use bodies which are movably attached to the internal walls of the chambers, so-called swinging bodies. They can be fastened in one single point and can then swing in all directions which the internal shape of the chamber allows, or they can be fastened in at least two points, in which case they have a definite swing-axis. A swinging body should have such a shape that it essentially fits to the internal chamber walls in its two turning points, thereby forcing out the liquid adhering to the walls. The degree and kind of turbulence induced by a swinging body depends on its shape in essentially the same manner as for rolling bodies. Swinging bodies should primarily be used in the case of a rocking motion of the chambers; however, they are also very effective for other types of motion.

The communication ducts for the liquids between the chambers can be made in two, in principle, different ways. One way consists in having one or several dimensionally definable channels, such as drilled holes, slits, or simply intervening spaces between bigger holes and not well-fitting stoppers or axles going through these holes. The other method consists in using filter elements as connections between two chambers. The second method is to be preferred if liquid or gaseous stirring bodies are used.

As a matter of fact, a filter wetted by a liquid is completely impenetrable to gases at pressures that can prevail in a gradient mixer, due to the strong capillary forces which show up in a capillary system. Similarly, one can prevent a liquid stirring body from flowing from chamber to chamber by using filter elements with a higher affinity (wettability) for the liquids to be mixed than for the stirring liquid. Such a filter element, once soaked in gradient-forming liquid, is impermeable to the stirring liquid.

Arrangements for introduction of liquid into one end and for removal of liquid from the other end compartment are, as a matter of principle, more complicated for a movable than for a resting chamber system, except for a rocking and for a shuttling movement. For these types of motion it is sufficient to make the entrance and exit ducts in a flexible material, e.g. rubber or plastic, which, incidentally, is often done in any case. It is somewhat more difficult to arrange in- and outflow of liquid in the case of a rotating chamber system. In one variety of the present invention, this has been accomplished by using tube-shaped axial bearings pressed against the two end chambers. These bearings thus function simultaneously as ducts for the liquid. The most useful bearings consist of ground ball joints at the end of tubes; such joints require no mutual centering. One can also use tube-shaped standard conical ground joints, which have larger tightening surfaces. However, one then has to accomplish an accurate mutual centering, or take care to have at least one part of the joint elastically embedded.

The adaptability of a gradient mixer to various courses of the liquid gradient increases with the number of chambers since every added chamber gives another degree of freedom in the form of an initial composition open to free choice. An increasing number of chambers, however, also makes it more laborious to calculate the course that is to be expected from the given initial compositions in the chambers. For more than two mixing chambers in series, with arbitrary volumes and arbitrary initial compositions, the mathematical expression for the composition of the effluent as a function of the volume is so complicated (and, incidentally, not generally deduced) that a calculation of the gradient takes longer time than to perform the experiment. The mathematical theory of the present invention, although rather simple in principle, is thus in the general case almost useless, and one has to find out the initial compositions which give the desired shape of the gradient in an experimental fashion. However, the special case that all chambers in the system have the same free volume (chamber volume minus volume of stirring body) is very easy to handle mathematically, and the general expression for the composition of the effluent can very well be used in order to prescribe suitable initial compositions in the chambers. According to an important variety of the present invention, therefore, the stirring bodies have volumes making the remaining chamber volumes equal throughout the whole system of chambers.

Figure 2:
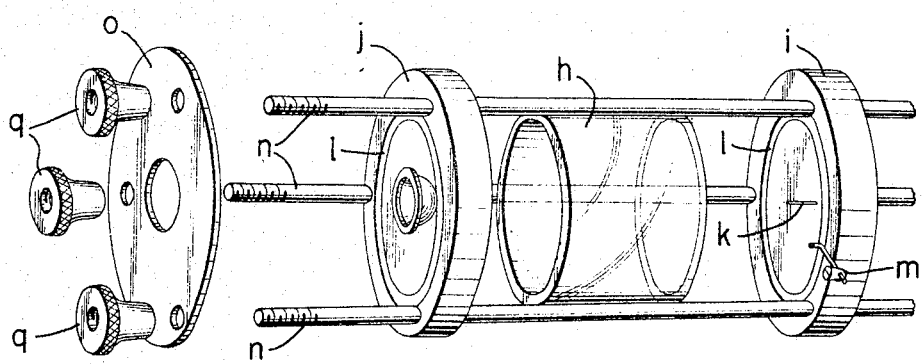
Figure 3:
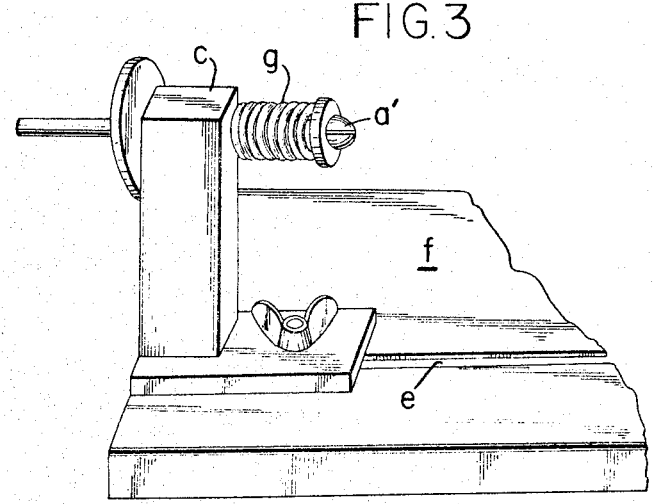
Figure 4:
Figure 5:
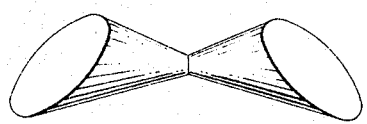
Figure 6:
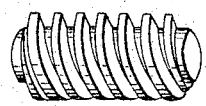

In the attached drawings are shown as examples, but not in any restricting sense, one possible type of gradient mixer according to the invention and some examples of suitable stirring bodies. FIG. 1 shows a view of an arrangement with 5 cylindrical chambers pressed together along a common cylinder axis which is also axis of rotation. FIG. 2 shows details of a chamber system composed of tube- and disc-shaped elements. FIG. 3 illustrates a displaceable bearing holder with an axial bearing equipped with a spring and displaceable within it. FIGS. 4–9, finally, show a number of different designs of rolling bodies suitable for homogenization of liquid in cylindrical mixing chambers: obliquely cut cylinder, obliquely cut double-cone, screw-shaped rolling body, rolling body with two wheels and propeller, rolling body with skew, disc-shaped wheels, and rocking-rolling body.

In the design shown in FIG. 1, use is made of a rotating chamber system between ball joints with channels ($a$, $b$) which also serve as entrance and exit ducts for liquid. The glass tubes attached to the ball joints are protected by rubber hoses and are clamped in bearing holders (c, d). One of these (c), which is shown separately in FIG. 3, is displaceable in a groove (e) in the base plate (f), whereby the number of chambers can be varied. Its ball joint (a') is held by a bearing under a spring (g) pressure. The spring allows an easy adjustment of the axial bearing pressure and a convenient removal and reintroduction of the chamber system between the bearings.

The chambers consist of separate tube (h) and disc (i) elements. Each disc, except the end discs (j), forms a partition wall between two chambers and has in the centre a capillary hole (k) right through. The two end discs (j) carry the concave parts of the ball joints. Tightening and centering of the chambers occurs in the ring-shaped grooves (l) in the discs (i, j), which grooves fit to the ends of the tube elements (h). The chambers are filled individually through the capillary ducts (m) in the discs, and these ducts can be closed by turning small, hollow stoppers which act as stop-cocks. In order to make possible an air-free filling (in a vertical position), the discs (i) have been given a slightly conical shape, with the communicating duct (k) in the top of the cone.

The tightening pressure for the chambers is accomplished by the aid of clamping rods (n) which operate with metal end plates (o, p) and are pulled tight by nuts (q) at one end. One metal plate (p) is designed as a gear which is driven to rotation by a motor (r).

The apparatus is operated in the following way in the case of 5 mixing chambers. The exit tube b is temporarily closed, and the apparatus is turned to an upright position. Through the duct m, the bottom chamber is filled with a certain solution $S_1$. When this solution has just filled the capillary hole k to the next chamber, the stopcock of the duct m is closed. The same procedure is then repeated for the other chambers, so that the second chamber is filled with a solution $S_2$, the third chamber with a solution $S_3$, the fourth chamber with a solution $S_4$, and the fifth chamber with a solution $S_5$. A large volume of a sixth solution, $S_6$, is finally placed in a flask, and a duct from this flask is connected to the entrance tube a of the mixer. The apparatus is now turned down to a horizontal position, and the exit tube b is connected, by a piece of capillary tubing, to the apparatus in which the liquid with a continuously varying composition is to be used. In the general case, the apparatus thus contains in its starting condition 5 different solutions $S_1$ to $S_5$, and during operation it is fed with the solution $S_6$ from the flask. To make a pH gradient, the solutions $S_1$ to $S_6$ of course have different pH values, to make a density gradient, they differ in density, and so on. Two or more of the six solutions may be identical, but not all of them.

The motor r is now started, whereby the chambers begin to rotate, and after that the liquid flow may be started. The liquid $S_6$ thus runs into $S_5$, $S_5$ into $S_4$, etc. all the way through the mixer, while the stirring bodies in the chambers homogenize the liquids all the time. The composition in each chamber thus changes continuously all the time, and so does the effluent that is conducted to the apparatus in which a pH, or a density, or a polarity, etc., gradient is to be used. The first portion of the effluent is identical with $S_1$, but after very large volumes the effluent approaches $S_6$ in composition and properties. The way in which the effluent changes from $S_1$ to $S_6$ depends on the properties of the intermediate solutions and on the free volumes of the chambers. The course of the gradient can thus be influenced by the choice of these variables.

We claim:

1. A device for producing a flow of liquid of continuously varying composition comprising at least two series-coupled mixing chambers with communication ducts of capillary dimensions therebetween; means for introducing liquid into one end chamber and for removal of liquid from the other end chamber; means for filling different chambers with different solutions; and means for stirring the contents of each chamber comprising stirring bodies chemically inert to the liquids to be mixed, characterized by driving means acting on the chambers to bring about relative movement between the liquids and the stirring bodies.

2. A device according to claim 1 characterized by a rotating motion of at least one chamber.

3. A device according to claim 1 characterized by essentially cylindrical mixing chambers.

4. A device according to claim 3 characterized by at least one mixing chamber being composed of essentially tube- and disc-shaped elements.

5. A device according to claim 1 characterized by at least one stirring body with an average density, defined as the ratio between its total mass and its total volume, lying outside the density range of the liquids to be mixed.

6. A device according to claim 1 characterized by at least one stirring body with an average density, defined as the ratio between its total mass and its total volume, lying outside the density range of the liquids to be mixed and further characterized by at least one rollable stirring body.

7. A device according to claim 1 characterized by at least one rolling stirring body having the form of an obliquely cut cylinder.

8. A device according to claim 1 characterized by at least one rolling stirring body having the form of an obliquely cut double-cone.

9. A device according to claim 1 characterized by at least one rolling stirring body which is essentially screw-shaped.

10. A device according to claim 1 characterized by at least one rolling stirring body comprising at least two wheels, interconnected and with such an orientation in space that their projections on a plane perpendicular to a roll-axis become essentially superposed closed curves.

11. A device according to claim 10 characterized in that the element connecting the two wheels is shaped like a propeller.

References Cited by the Examiner

UNITED STATES PATENTS

| 2,185,158 | 12/1939 | Price | 259—3 |
| 2,401,431 | 6/1946 | Lewis | 259—3 X |

IRVING BUNEVICH, *Primary Examiner.*

WALTER A. SCHEEL, *Examiner.*

JOHN M. BELL, *Assistant Examiner.*